March 5, 1957 V. C. JOHNSON 2,783,526
TURRET HEAD MACHINE TOOL
Filed March 12, 1956 2 Sheets-Sheet 1
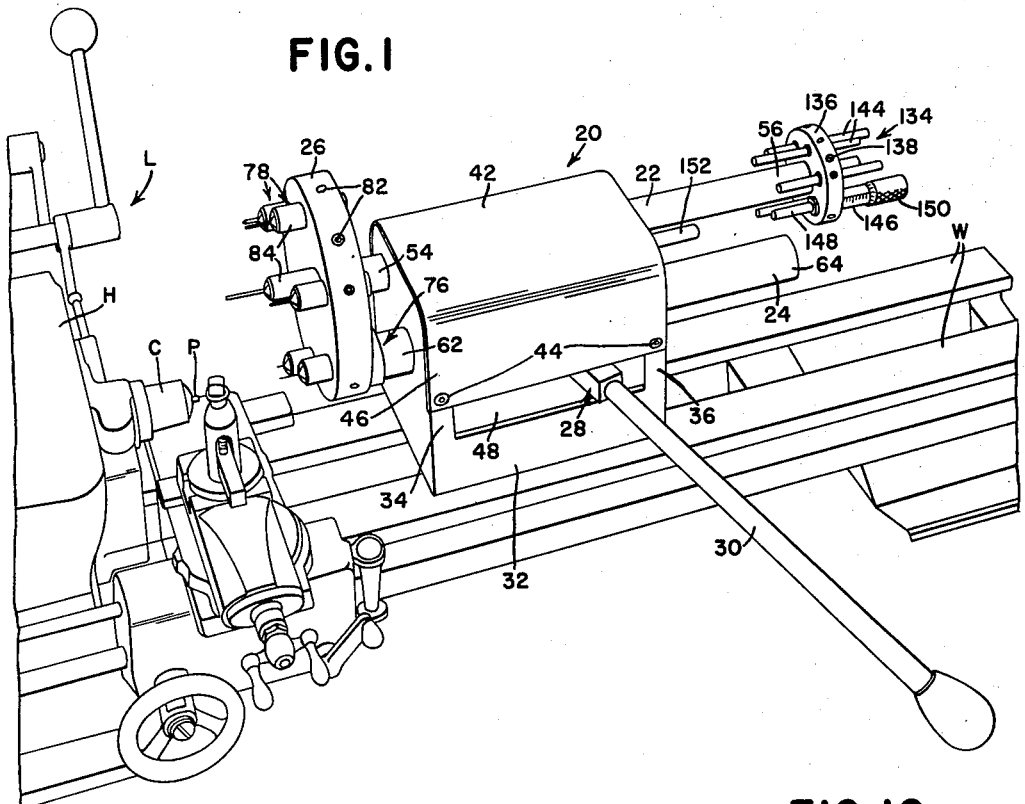
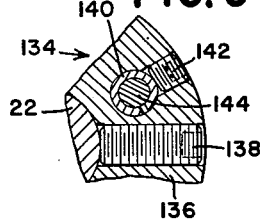
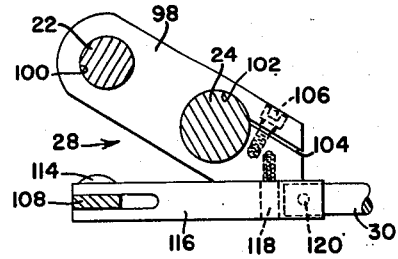
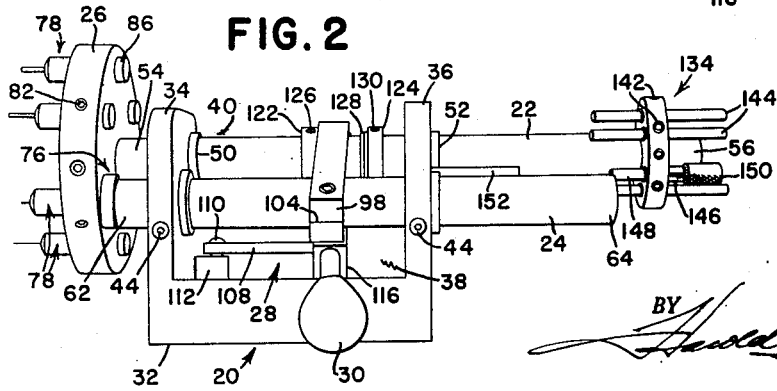
INVENTOR.
V. C. JOHNSON
BY
ATTORNEY March 5, 1957  V. C. JOHNSON  2,783,526
TURRET HEAD MACHINE TOOL Filed March 12, 1956  2 Sheets-Sheet 2

*INVENTOR.*
V. C. JOHNSON
BY
ATTORNEY

United States Patent Office 2,783,526
Patented Mar. 5, 1957

2,783,526
TURRET HEAD MACHINE TOOL
Victor C. Johnson, Davenport, Iowa

Application March 12, 1956, Serial No. 570,835

17 Claims. (Cl. 29—45)

This invention relates to a precision machine tool and more particularly to a tool of the horizontal turret head type adapted to enable the successive employment of a plurality of different tools on a work piece chucked or otherwise carried on a centerline relative to which the turret is angularly movable so as to bring the tools into working relationship at selected stations. In its significant aspects, the invention affords material improvements over the design forming the subject matter of my copending application Serial No. 461,635, filed Oct. 11, 1954.

The invention features a novel, as well as an extremely attractive, mechanism which embodies ease of operation, simplicity of adjustment and maintenance and initial low cost, which attributes flow from a box-like support including a removable cover that affords an enclosure for the major components but which leaves exteriorly exposed those fundamental parts requiring manipulation and/or adjustment as successive operations are carried out. A significant object of the invention relates to the provision of novel means for obtaining precise alinement or coaxial register of the tool or tools and the workpiece. Other objects of no less importance include the provision of: the turret head tool as an attachment for a large and wide variety of lathes, regardless of make or manufacture; improved pressure pads for supporting the shafts of the tool; novel actuator means for reciprocating the parts toward and away from the work; control means operative upon retraction of the parts through a certain range for declutching the turret head so that it is rotatable to another stage; and overall features of design affording an attractive and economical item capable of accomplishing precision machining functions with extreme accuracy and at a cost well below that of more complicated mechanisms. And a still further and important object is the provision of improved stop means for limiting the depth of drilling, boring, facing etc. Operations of the respective tools carried by the turret, at least one of the devices in the stop means comprising a micrometer head by means of which fractional cuts etc. may be achieved accurately and with a minimum of setting, re-adjustment and other painstaking procedures.

The foregoing and other important objects and desirable features inherent in and encompassed by the invention will occur to those versed in the art as a preferred embodiment of the invention is disclosed in the ensuing specification and accompanying sheets of drawings, the several figures of which will be described below.

Figure 1 is a perspective of the tool in situ on one well-known type of lathe.

Figure 2 is a perspective of the tool per se, with its cover removed.

Figure 9 is an enlarged fragmentary section on the line 9—9 of Fig. 3.

Figure 10 is a section on the line 10—10 of Figure 3.

Figure 3:
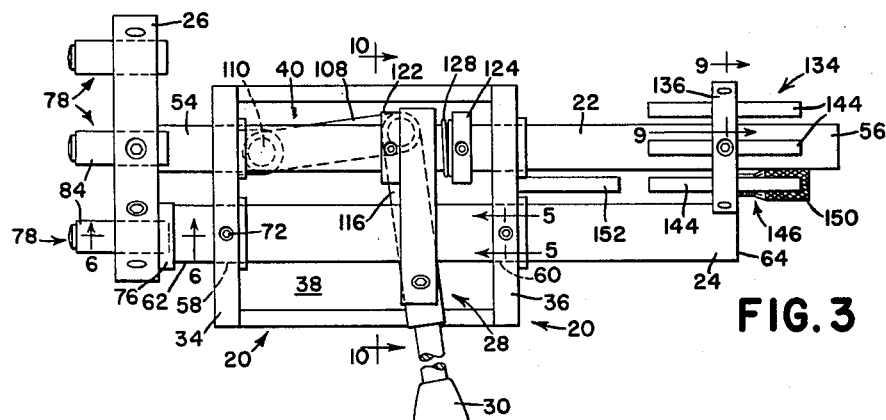
Figure 3 is a plan of the structure shown in Fig. 2, depicting the working relationship of the parts.

The machine comprises a box-like support 20, a head shaft 22, an index shaft 24, a turret head 26, an actuator 28 and an operating handle 30, in addition to components and detailed elements to be described below. The support is made up of a fore-and-aft base 32 having integral therewith or otherwise rigidly related thereto front and rear upright end walls 34 and 36, which afford a lower housing portion 38 of a compartment 40 that is completed and enclosed by a tunnel-like cover 42. Fasteners, such as conventional Allen-head screws 44, may be used to secure the cover in place (Fig. 1), it being understood that similar fasteners (not shown) are present on the reverse side of the support. It is clear, of course, that the depending sides of the cover, one of which sides is visible at 46 in Figure 1, afford side walls for the box-like structure, the foremost side wall providing an opening 48 through which the operating handle 30 projects. The base is provided with suitable means, not shown, for the affixation of the support to the ways W of a conventional lathe, a typical example of which is shown generally at L in Figure 1 as having a headstock H including a chuck C in which is chucked a work piece P. The attachment replaces the usual tailstock. Other characteristics of the lathe will be recognized without elaboration here.

Figures 4, 5:
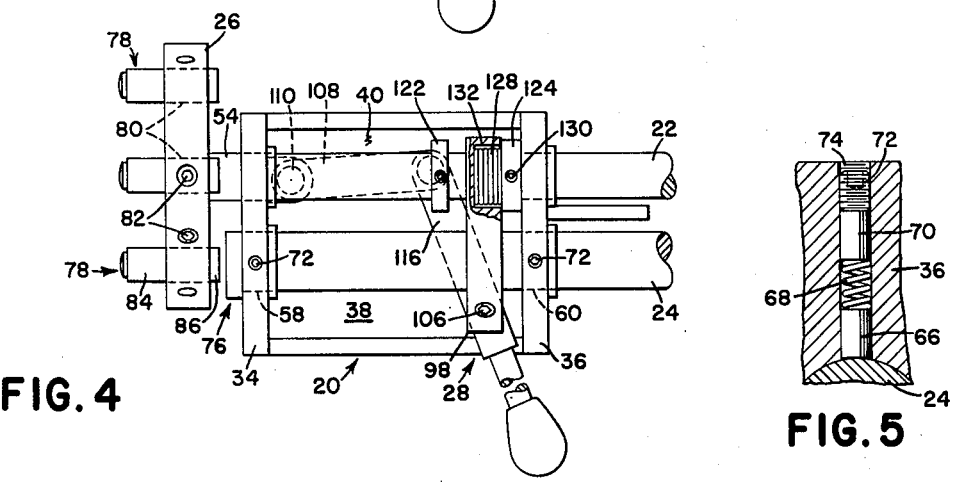
Figure 4 is similar to Fig. 3 but shows the declutching function of the parts.
Figure 5 is an enlarged fragmentary section on the line 5—5 of Figure 3.
Figure 7:
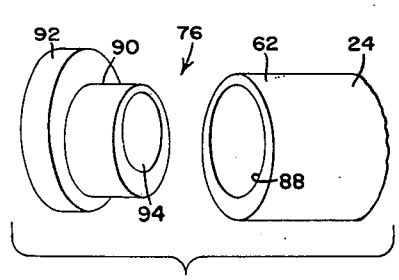
Figure 7 is an exploded fragmentary perspective of part of the index means.

The front and rear walls 34 and 36 respectively have a first pair of front and rear coaxial apertures appropriately bushed at 50 and 52 to carry the head shaft 22 for both axial and angular movement; and this shaft has front and rear end portions 54 and 56 projecting respectively ahead of and behind the front and rear end walls 34 and 36. These walls are additionally provided with a second pair of front and rear apertures 58 and 60 for supporting the index shaft 24 for both axial and angular movement. This shaft has front and rear end portions 62 and 64 projecting respectively ahead of and behind the front and rear walls 34 and 36. Pressure pads, one of which is best shown in Figure 5, maintains the accurate alinement of the index shaft and compensates for wear. As illustrated in the figure just referred to each pad comprises an appropriate bronze or other suitable cylinder 66 loaded by a spring 68 which is backed up by a steel cylinder 70 and a screw 72 of the recessed-head type, all carried in a bore 74 radial to the shaft 24. The arrangement is the same in both walls 34 and 36.

The front end 62 of the index shaft 24 is provided with index means, designated generally by the numeral 76, for indexing and interlocking with and for declutching from any one of several tool holder elements or devices 78 carried by the turret head 26 in angularly spaced relation about a circle concentric with the head shaft 22 and generally intersecting a forward prolongation of the index shaft axis, the turret head being of such diameter and occupying such position as to lie ahead of the index means 76. In the preferred embodiment shown, the tool holder elements are separate collets of cylindrical form individually carried in fore-and-aft bores 80 in the turret head 26. Each collet is held in its bore by a suitable fastener, such as a recessed-head screw 82, and each collet has a forward tool-receiving portion 84 and a rearwardly projecting indexing portion 86. The collets normally carry, respectively, different types of boring, spotting, etc. tools, as will be clearly apparent from Figures 1 and 2 without further description, it being understood that any one of these tools can be employed on the chucked work piece W according to the indexed position of the turret head; that is, each tool is brought into coaxial register with the work piece upon declutching of the index means 76 and collet rear portion 86, rotation of the turret head to its desired position and relocking at 76—86 to hold the turret head against angular movement until a different tool station is desired, which functions will be comprehended from the description to ensue.

Figure 6:
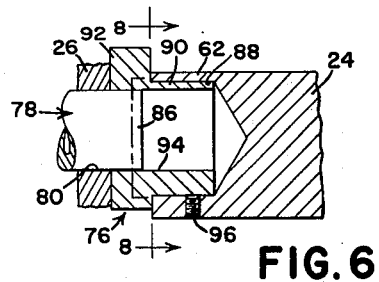
Figure 6 is an enlarged fragmentary section on the line 6—6 of Fig. 3.
Figure 8:
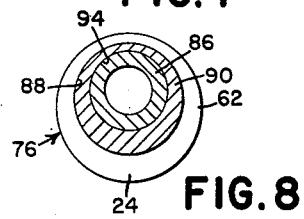
Figure 8 is a section on the line 8—8 of Figure 6.

The index means comprises a forwardly opening pilot bore 88 formed in the front end 62 of the index shaft 24 on an axis eccentric to the shaft axis; and a bushing 90, flanged at 92 and having an index bore 94 eccentric to the pilot bore 88. The bushing is angularly adjustable in the pilot bore 88 and consequently the relative eccentricity may be carried to secure precise axial register with the centerline of the lathe chuck C and consequently with the work piece P, especially as to vertical distance above the lathe ways W. This adjustment, once achieved, is retained by releasable locking means comprising a recessed-head screw 96 (Figure 6). Because of manufacturing tolerances, it is virtually impossible, in a lathe and tool set-up to find that the vertical distance between the ways W and the chuck centerline exactly equals that between the undersurface of the base 32 and the centerline of the index shaft 22. Hence the desirability for the adjustment herein provided, especially where the working tolerances permitted in precision work for which the instant machine is designed, are so relatively minute. Moreover, the adjustment adds to the versatility of the machine in its adaptation to various types and makes of lathes.

As a further adjunct to this adjustment, the index shaft itself may be angularly adjusted relative to the support walls 34 and 36 and relative to the bushing 90. Normally, the index shaft is locked against angular movement, because it is undesirable that this shaft rotate once adjustment is secured. Since the shaft must, however, continue to be shiftable fore-and-aft in the walls 34 and 36, it is feasible to afford the anti-rotation or locking means in the actuator 28. For this purpose, the actuator includes a member 98 transverse to the axes of the shafts 22 and 24 and having fore-and-aft bores 100 and 102 for respectively receiving these shafts (Figure 10). The member 98 has a split 104, radial to the bore 102 for the index shaft 24, and the portions of the member defined by the split afford parts of a clamp including a locking screw 106. When this screw is loosened, the shaft 24 may be angularly adjusted, and when the index locking screw 96 is also loosened, the bushing 90 and index shaft can be relatively rotated until the desired axial register of the index bore 94 is achieved with the chuck centerline, after which the screws are tightened and the index shaft is non-rotatable; thus, the clamp, including the screw 106, comprises means interconnecting the actuator and index shaft for fore-and-aft movement in unison. The bore 100 for the head shaft 22 is fractionally larger than the head shaft to permit angular and axial movement of the head shaft, when the occasion demands, without requiring the release of any special means. On the other hand, the two bores 100 and 102 and their relationship to the member 98 serve to prevent all but fore-and-aft movement of the actuator, which thereby establishes the actuator member as an ideal anchor for anti-rotation of the index shaft via the clamp at 106.

When the index bore 94 is properly related to the chuck centerline, the rear or index end 86 of the selected tool holder or collet 78 is registered with and rearwardly receivable or indexed in the index bore to afford a releasable lock holding the turret head against angular movement about the head shaft axis. In this respect it should be noted here that the turret head is rigidly fixed to the front end of the head shaft in the interests of avoiding a movable connection, which is apt to be reflected in a decline in accuracy; but it is within the spirit of the invention to journal the turret head on the head shaft rather than to make the two an integral unit rotatable in the wall bores and bushings 50 and 52.

Mounting of the actuator for fore-and-aft movement is achieved by a fore-and-aft link 108 having a vertical pivot 110 to a boss 112 on the base 32 and a vertical pivotal connection 114 to a second link 116, which second link has a vertical pivotal connection 118 to the underside of the actuator member 98. The outer end of the link 116 is socketed to removably receive the inner end of the handle 30, a set screw 120 being used as a lock (Figure 10).

As the actuator 28 is moved back and forth it serves to accomplish axial shifting of the head and index shafts 22 and 24 but through different ranges, the range of the head shaft being shorter so as to effectuate declutching of the indexed collet from the index means 76 upon the rearward stroke of the actuator when the range of the head shaft is exceeded by the actuator and index shaft. This result stems from the provision on the head shaft of front and rear stops in the form of collars 122 and 124 respectively. The front collar is affixed to the shaft 22, as by a set screw 126, and is positioned ahead of the actuator member 98 so as to be engaged from behind by the actuator as the actuator is moved forwardly, thus causing forward movement of the actuator, index shaft and head shaft in unison, which movement is utilized in moving the tool in the selected or indexed collet 78 toward the work P. Rearward movement of the head shaft through its range, with provision for rearward overtravel of the actuator and index shaft is provided for by the rear stop 124 and yielding drive means, here in the form of a coiled compression spring 128 interposed between the rear side of the member 98 and the stop collar 124, the latter being affixed to the head shaft, as by a set screw 130, in a position spaced ahead of the rear wall 36 in the normal or index-lock status of the machine (Figures 2 and 3). The member 98 is provided with a pocket 132 which receives such portion of the spring 128 that when the spring is fully compressed (Figure 4), the member 98 directly engages the collar 130 and the collar abuts the rear wall 36. Thus, abutment of the collar 130 with the rear wall 36 stops the head shaft against further rearward movement and continued rearward movement or overtravel of the actuator compresses the spring 128 and carries the index shaft sufficiently farther to the rear to disengage the index bore 94 from the rear end 86 of the registered collet 78. At this stage, the turret head is now free to be moved angularly to bring another collet into register with the index bore so that another operation may be performed on the work P. However, in normal feeding of the indexed collet-held tool, and in retracting of that tool to determine the progress of the particular operation, the actuator will be moved fore and aft within the head shaft range, the spring 128 affording the necessary "feel" so that declutching at 76—86 is not needlessly effected.

Adjustable limits on forward movement of the turret head in accordance with the selected operations on the work P are achieved by a duplex stop device, indicated in its entirety at 134, comprising a multi-apertured collar 136 adjustably secured to the head shaft by a set screw 138 and itself adjustably carrying, via individual split sleeves 140 and set screws 142, a plurality of stop elements or rods 144, one of which is a micrometer head 146 having an adjustable shaft 148 and an adjusting barrel 150. These stop elements are equal in number to and are coordinated as to angular spacing with the collets 78, so that each collet station has an element on the device 134, one of which elements is the micrometer head. Each element, according to the collet that has been indexed at 76, is alined fore-and-aft with a support-carried abutment or fixed stop rod 152 that projects rearwardly from the support rear wall 36. Fore-and-aft adjustment of the stop rods 144 via their respective set screws 142 determines the forward limit on the turret head for an indexed collet-carried tool and thus regulates the depth, etc. of such tool. In certain types of extremely small work, the micrometer head permits not only more accurate adjustment but also a desirable "feed" of the selected tool, since, as light forward pressure is imposed on the handle 30 to move the tool into the work via the actuator, etc., the micrometer may be backed off as desired, the operator employing one hand on the handle 30 and the other to regulate the micrometer head shaft 148 as it engages the fixed stop 152. At this point it should be noted that the relationship between the micrometer shaft and the fixed stop 152 is clear in Figs. 1 and 2 but that the micrometer shaft is obscured by the stop rod 144 immediately above it in Figures 3 and 4. Nevertheless, it is intended that the figures be consistent in showing fore-and-aft alinement of the stop 152 and micrometer shaft 148.

The operation and use of the machine tool are believed to be clear from the foregoing, and the same applies to the salient features of the design and construction. Features and advantages not categorically enumerated will readily occur to those versed in the art, as will variations and modifications in the embodiment disclosed, all of which are available without departure from the spirit and scope of the invention.

What is claimed is:

1. A machine tool of the class described, comprising: a support having a base and front and rear walls spaced apart and rising from the base; a fore-and-aft head shaft carried by the walls for relative axial shifting and having front and rear ends respectively ahead of and behind the front and rear walls; an index shaft parallel to the head shaft and carried by the walls for relative axial shifting and having front and rear ends respectively ahead of and behind the front and rear walls; index means on the front end of the index shaft affording a forwardly opening index bore; a turret head coaxially mounted on the front end of the head shaft forwardly of the index means for axial shifting with the head shaft and for angular movement about the head shaft axis, said turret head having therein a plurality of angularly spaced apart fore-and-aft tool holder bores selectively positionable ahead of and in axial register with the index bore upon angular movement of the turret head; a tool holder carried in at least the registered tool holder bore and projecting normally rearwardly into the index bore to lock the turret head against angular movement until said tool holder and index bore are axially separated; a fore-and-aft shiftable actuator mounted on the support between the walls; means interconnecting the actuator and the index shaft for fore-and-aft shifting in unison; a front stop fixed to the head shaft intermediate the front wall and actuator and engageable from behind by the actuator for effecting forward movement of the head shaft and turret in unison with the actuator and index shaft whereby the registered tool holder remains in the index bore; a rear stop fixed to the head shaft in normally intermediately spaced relation between the actuator and rear wall and adapted to abut said rear wall upon predetermined rearward movement of said head shaft; and a spring interposed between the actuator and the rear stop and affording a yielding drive means enabling rearward shifting of the head shaft by the actuator until the rear stop abuts the rear wall, said spring yielding to enable rearward overtravel of the actuator and index shaft for effecting rearward axial separation of the index bore from the tool holder so that the turret head may be moved angularly, said spring being effective to urge the actuator forwardly when rearward force on the actuator is released.

2. The invention defined in claim 1, in which: the support is of box-like construction in which the base and front and rear walls respectively provide a bottom and opposite ends defining a lower housing portion, and said support further includes a removable cover spanning the front and rear walls from above and affording an upper housing portion complementing the lower housing portion to provide a compartment containing the intermediate portions of the shafts, the front and rear stops, the actuator and the spring, said cover having at least one side wall provided with an opening affording access to the actuator; and the actuator has a handle extending through the opening.

3. The invention defined in claim 2, including: an exterior stop device on the rear end of the head shaft for limiting forward movement of said head shaft, said device comprising a carrier secured to the head shaft and a plurality of carrier-mounted fore-and-aft adjustable stop members equal in number to and coordinated as to angular spacing with the tool holder bores, and an exterior abutment on the support at the rear thereof and engageable by the stop member for that tool holder bore that is in register with the index bore.

4. The invention defined in claim 3, in which: at least one of the stop members is a micrometer head having a fore-and-aft adjustable shaft on an axis parallel to the head shaft and engageable with the exterior abutment when the tool holder bore coordinated with the micrometer shaft is in register with the index bore.

5. The invention defined in claim 1, in which: the index means comprises a forwardly opening pilot bore in the front end of the index shaft and eccentric to the index shaft axis, an index bushing received in the pilot bore and containing the index bore in eccentric relation to the axis of the pilot bore, said bushing being angularly adjustable about the pilot bore axis to afford precise axial register of the tool holder and index bore, and means for retaining the adjusted position of the bushing.

6. The invention defined in claim 5, in which: the actuator is confined to all but fore-and-aft movement; the index shaft is angularly adjustable about its axis in the support walls; and releasable means cooperates between the actuator and index shaft for holding the latter against angular movement.

7. The invention defined in claim 1, including: a stop device on the rear end of the head shaft for limiting forward movement of said head shaft, said device comprising a carrier secured to the head shaft and a plurality of carrier-mounted fore-and-aft adjustable stop members equal in number to and angularly spaced in coordination with the tool holder bores, an abutment on the support engageable by that stop member for the tool holder bore in register with the index bore, and at least one of the stop members being a micrometer head having a fore-and-aft adjustable shaft on an axis parallel to the head shaft and engageable with the abutment when the tool holder bore coordinated with the micrometer shaft is in register with the index bore.

8. The invention defined in claim 1, in which: the index means comprises an index member separate from but carried by the front end of the index shaft for adjustment transversely to the index shaft axis, said index member containing the index bore, and said adjustment providing for precise axial register of the index bore and a tool holder.

9. A machine tool of the class described, comprising: a support having a base and front and rear walls spaced apart and rising from the base; a fore-and-aft head shaft carried by the walls for relative axial shifting and having front and rear ends respectively ahead of and behind the front and rear walls; an index shaft parallel to the head shaft and carried by the walls for relative axial shifting and having front and rear ends respectively ahead of and behind the front and rear walls; index means on the front end of the index shaft; a turret head coaxially mounted on the front end of the index shaft; a turret head coaxially mounted on the front end of the head shaft forwardly of the index means for axial shifting with the head shaft and for angular movement about the head shaft axis, said turret head having thereon a plurality of angularly spaced apart tool holder elements selectively positionable ahead of and in fore-and-aft register with the index means; said index means and each registered tool holder element including cooperative lock portions engageable upon forward shifting of the index shaft relative to the turret head and disengageable upon rearward shifting of the index shaft relative to the turret head; a fore-and-aft shiftable actuator mounted on the support between the front and rear walls; means interconnecting the actuator and the index shaft for fore-and-aft movement of the two in unison; a front stop fixed to the head shaft intermediate the front wall and actuator and engageable from behind by the actuator for effecting forward movement of the head shaft in unison with the actuator and index shaft for retaining engagement of the aforesaid lock portions; a rear stop fixed to the head shaft normally intermediately spaced between the actuator and rear wall and adapted to abut the rear wall upon predetermined rearward movement of the head shaft; and a spring interposed between the actuator and the rear stop and serving as yieldable drive means enabling rearward shifting of the head shaft until the rear stop abuts the rear wall, said spring yielding to permit rearward overtravel of the actuator and index shaft for rearwardly disengaging said lock portions, whereby the turret head may be moved angularly, said spring being effective to urge the actuator and index shaft forwardly when rearward force on the actuator is released.

10. The invention defined in claim 9, in which: the index means lock portion is adjustable relative to the index shaft in a direction transverse to the axis of said index shaft to obtain precise fore-and-aft register of the index means lock portion and the lock portion of the selected tool holder element.

11. The invention defined in claim 9, in which: the spring is of the coiled compression type and encircles the head shaft between the rear stop and the actuator, and the actuator has a rear part provided with a rearwardly facing pocket accommodating a forward portion of the spring, said pocket being of such fore-and-aft depth as to house all of the spring when the spring is compressed against the rear stop upon abutment of said rear stop and rear wall incident to overtravel of the actuator and index shaft.

12. A machine tool of the class described, comprising: a support having front and rear ends; a fore-and-aft head shaft carried by the support for relative axial shifting and having front and rear ends respectively ahead of and behind the front and rear ends of the support; an index shaft carried by the support in parallelism with the head shaft for relative axial shifting and having front and rear ends respectively ahead of and behind the front and rear ends of the support; index means on the front end of the index shaft; a turret head coaxially mounted on the front end of the head shaft forwardly of the index means for axial shifting with the head shaft and for angular movement about the head shaft axis, said turret head having thereon a plurality of angularly spaced apart tool holder elements selectively positionable ahead of and in fore-and-aft register with the index means; said index means and each registered tool holder element having cooperative lock portions, engageable upon forward shifting of the index shaft relative to the turret head and disengageable upon rearward shifting of the index shaft relative to the turret head; fore-and-aft shiftable actuator means on the support and connected to the shafts for shifting both shafts forwardly in unison and for shifting both shafts rearwardly in unison through a predetermined range, said actuator means being operative to shift the index shaft rearwardly relative to and beyond the head shaft to disengage the aforesaid lock portions, said support including a stop limiting rearward movement of the head shaft to said predetermined range; a stop device on the rear end of the head shaft for limiting forward movement of the head shaft, said device including a carrier fixed to the head shaft and a plurality of fore-and-aft adjustable stop members carried by the carrier, said stop members being equal in number to and coordinated as to angular spacing with the tool holder elements, an abutment on the support engageable by the stop member that is coordinated with the tool holder element engaged with the index means, and at least one of said stop members comprising a micrometer head having its axis parallel to the head shaft and including a fore-and-aft adjustable micrometer shaft engageable with said abutment when the tool holder element coordinated with said micrometer head is in fore-and-aft register with the index means.

13. A machine tool of the class described comprising: a box-like support having front and rear end walls, a base, side walls and a removable cover defining a compartment, one of said side walls having an opening therethrough, and said end walls having a first pair of bores therethrough alined on a first fore-and-aft axis and further having a second pair of bores therethrough alined on a second fore-and-aft axis parallel to the first axis; a head shaft axially shiftably carried in the first pair of bores and having an intermediate portion within the compartment and front and rear exterior ends respectively ahead of and behind the support; an index shaft axially shiftably carried in the second pair of bores and having an intermediate portion within the compartment and front and rear exterior portions respectively ahead of and behind the support; index means on the exterior front end of the index shaft and including a lock portion; a turret head coaxially mounted on the exterior front end of the head shaft forwardly of the index means for axial shifting with the head shaft and for angular movement about said first axis, said turret head having a plurality of tool holder elements spaced angularly about a circle concentric with said first axis and generally intersecting the second axis, said elements being selectively alinable fore-and-aft with the index means upon angular movement of the turret head, each element having thereon a lock portion registrable with the index means lock portion when said element is alined with the index means, said registered lock portions being engageable upon movement of the index shaft forwardly relative to the turret head and disengageable upon movement of the index shaft rearwardly relative to the turret head; a fore-and-aft movable actuator carried by the support within the compartment and having an operating handle projecting exteriorly through the side opening; means within the compartment and interconnecting the actuator and index shaft for forward movement of the two in unison relative to the head shaft so as to incur engagement of the registered lock portions, said interconnecting means also affording rearward movement of the index shaft by the actuator through a predetermined range; a front stop fixed to the intermediate portion of the head shaft ahead of the actuator and engageable from behind by the actuator to incur forward movement of the head shaft in unison with forward movement of the index shaft after engagement of said lock portions; a rear stop fixed to the intermediate portion of the head shaft behind the actuator and in forwardly spaced relation to an interior portion of the support to limit rearward movement of the head shaft to a range shorter than that of the index shaft; and yielding drive means within the compartment and between the actuator and the intermediate portion of the head shaft for moving the head shaft rearwardly through its range, and said drive means yielding when the rear stop engages said interior portion of the support so that the actuator carries the index shaft rearwardly through its greater range and thus incurs disengagement of the aforesaid lock portions.

14. The invention defined in claim 13, in which: the actuator is mounted within the compartment on fulcrum means including an upright pivot; said actuator extends transverse to the shaft axes and has a pair of bores therethrough respectively receiving the intermediate portions of the shafts, said head shaft being axially slidably received in the one actuator bore; and the interconnecting means between the actuator and the index shaft includes a clamp releasably fixing the index shaft to the actuator.

15. The invention defined in claim 14, in which: the actuator has a split therein radial to the actuator bore that receives the index shaft and the portions of the actuator separated by said split afford parts of the clamp, and the clamp is complemented by a screw interconnecting said split-separated portions.

16. The invention defined by claim 1, in which: the actuator includes a transverse member having a pair of bores therein through which the shafts respectively pass; and the means interconnecting the index shaft and actuator for movement in unison includes a securing member transverse to the index shaft axis and operative to effect a clamping action of the transverse member on said index shaft via said index bore in the transverse member.

17. The invention defined in claim 1, in which: the actuator includes a member transverse to the shafts; and the actuator is mounted for fore-and-aft movement by means including a fore-and-aft link pivoted at one end to the base, a transverse link pivoted at one end to the other end of the fore-and-aft link and pivoted at its other end to the transverse member.

References Cited in the file of this patent

UNITED STATES PATENTS

| | | |
|---|---|---|
| 674,177 | Von Pittler | May 14, 1901 |

FOREIGN PATENTS

| | | |
|---|---|---|
| 75,073 | Switzerland | May 16, 1917 |